United States Patent [19]

Biles

[11] Patent Number: 5,013,107

[45] Date of Patent: May 7, 1991

[54] POLARIZATION SELECTIVE HOLOGRAPHIC OPTICAL ELEMENT

[76] Inventor: Jonathan R. Biles, 1422 SE. Knight St., Portland, Oreg. 97202

[21] Appl. No.: 244,955

[22] Filed: Sep. 15, 1988

[51] Int. Cl.$^5$ .................. G02B 5/32; G02B 27/28; G02B 27/42

[52] U.S. Cl. .................. 350/3.7; 350/395; 350/162.11; 369/103; 369/109

[58] Field of Search .................. 350/3.7, 3.72, 3.77, 350/370, 394, 395, 162.11, 162.17; 369/103, 109; 365/121, 124, 125

[56] References Cited

U.S. PATENT DOCUMENTS

| | | | |
|---|---|---|---|
| 4,458,980 | 7/1984 | Ohki et al. | 369/103 |
| 4,497,534 | 2/1985 | Sincerbox . | |
| 4,637,678 | 1/1987 | Moss et al. | 350/3.7 |
| 4,776,652 | 10/1988 | Ih | 350/3.72 |
| 4,802,719 | 2/1989 | Magarinos et al. | 350/3.7 |
| 4,824,191 | 4/1989 | Kato et al. | 350/3.72 |
| 4,830,441 | 5/1989 | Chang | 350/3.7 |
| 4,832,427 | 5/1989 | Nanba et al. | 350/3.77 |
| 4,892,369 | 1/1990 | Moss | 350/3.7 |

OTHER PUBLICATIONS

Kogelnik, "Coupled Wave Theory for Thick Hologram Gratings," *Bell System Technical Journal*, vol. 48, No. 9, Nov. 1969, pp. 2909-2947.

Kimura et al., "Compact Optical Head Using a Holographic Optical Element for CD Players," *Applied Optics*, vol. 27, No. 4, Feb. 15, 1988, pp. 668-671.

Lin et al., "Efficient and Aberration-Free Wavefront Reconstruction," *Applied Optics*, vol. 10, No. 6, Jun. 1971, pp. 1314-1318.

Winick, "Designing Efficient Aberration-Free Holographic Lenses," *Journal of the Optical Society of America*, vol. 72, No. 1, Jan. 1982, pp. 143-148.

Moran, "Compensation of Aberrations due to Wavelength Shift in Holography," *Applied Optics*, vol. 10, No. 8, Aug. 1971, pp. 1909-1913.

Malin et al., "Wavelength Scaling Holographic Elements," *Optical Engineering*, vol. 20, No. 5, Sep./Oct. 1981, pp. 756-758.

Latta et al., "Design Techniques for Forming 488-nm Holographic Lenses with Reconstruction at 633 nm," *Applied Optics*, vol. 18, No. 14, Jul. 15, 1979, pp. 2418-2421.

*Primary Examiner*—Bruce Y. Arnold
*Assistant Examiner*—Martin Lerner
*Attorney, Agent, or Firm*—Fliesler, Dubb, Meyer & Lovejoy

[57] ABSTRACT

A polarization-selective holographic element having first and second holographic layers, each holographic layer including holograms comprising a plurality of fringes. The holographic optical element transmits a first component of light without diffraction and diffracts a second component of the light by a selected angle. The holographic optical element diffracts the second component into only one beam. The holographic optical element can be utilized as a beam splitter which is provided with optical power, for use in an optical head, by storing holograms for cylindrical and other powers and for auto-focusing and tracking capabilities.

28 Claims, 5 Drawing Sheets

POLARIZATION SELECTIVE HOLOGRAPHIC OPTICAL ELEMENT

CROSS-REFERENCE TO RELATED APPLICATION

The subject Application is related to the co-pending Application entitled DUAL WAVELENGTH POLARIZATION SELECTIVE HOLOGRAPHIC OPTICAL ELEMENT, inventors Jonathan R. Biles and Ho Wai Lo, filed Sept. 15, 1988, Ser. No. 071,244,955;

BACKGROUND OF THE INVENTION

1. Field of the Invention

The present invention relates to a holographic optical element; more particularly, a polarization-selective holographic beam splitter useful in an optical head.

2. Description of the Related Art

Optical heads are utilized to guide radiation, e.g., light, emitted from a laser to the surface of a data storage medium and to guide the light reflected from the data storage medium to a detector. It is desirable to have the incident light traveling in a direction normal to the surface of the data storage medium, and thus the reflected beam travels the same path as the incident beam. Accordingly, it is necessary to separate the incident and reflected beams so that the reflected beam can be directed to a detector. This process of imaging light onto the surface of a recording medium and detecting the reflected light, for optically storing and retrieving data or for tracking in an optical, magnetic or magneto-optic storage system, requires a large number of expensive optical elements.

In the following discussion of conventional optical heads and existing designs of holographic beam splitters, an optical head for use, e.g., in a compact disk player, is described to facilitate the description of the related art. A first conventional optical head will be described with reference to FIG. 1. The optical head of FIG. 1 includes a laser 10 which provides a beam of incident light 12. The light emitted by laser 12 is polarized and the laser is rotated to select the direction of polarization with respect to the direction of the incident beam 12. The incident beam 12 can have either P or S polarization—in general the laser is rotated so that beam 12 is P-polarized. Polarized beam 12a passes through collimator 14 and then enters polarization beam splitter 18 which is designed to allow a first polarization-type incident beam (i.e., P-polarized beam 12a) to pass therethrough without change. The polarized incident light beam then enters a quarter-wave plate 20 which converts the P-polarized incident beam 12a to circularly polarized incident beam 12b. The circularly polarized incident beam 12b can be right or left circularly polarized depending on the orientation of the quarter-wave plate 20 and the polarization, i.e., S or P polarization, of the polarized incident beam 12a. Beam 12b is focused on the surface of an optical storage medium, for example, a compact disk 22, by an objective 24.

Upon reflection from the surface of compact disk 22, circularly polarized incident beam 12b is converted to a reflected beam having the opposite type circular polarization, a right-hand circularly polarized beam 12b is converted to a left-hand circularly polarized beam and vice versa. Thus, circularly polarized reflected beam 12c has the opposite circular polarization type from circularly polarized incident beam 12b. Beam 12c is re-collimated by objective 24, and then converted to second polarization type reflected light 12d (i.e., S type polarization) having an opposite polarization type from first polarization-type incident light 12a. Polarization beam splitter 18 causes beam 12d to be directed towards a detector 26. A concentrating lens 28 is provided between polarization beam splitter 18 and detector 26 to focus beam 12d on the detector 26.

Conventional polarization beam splitter 18 provides a 90° re-direction of the reflected beam 12d. Accordingly, detector 26 must be placed alongside the polarization beam splitter 18 so that beam 12d is incident on detector 26. When the optical head is moved to track the beam over the surface of the storage medium 22 the space occupied by detector 26 becomes significant. Further, concentrating lens 28 must be carefully aligned with polarization beam splitter 18 (or the optical path or redirected beam 12d) and detector 26 must be aligned with the optical path to allow detector 26 to focus and track beam 12b on disk 22, and to read data on disk 22. This alignment must be accurate to within tens of microns. In addition, concentrating lens 28 is an expensive element, due in part to the need for astigmatic power to provide proper focusing.

A second conventional optical head, manufactured by Pencom International Corporation, employs a hologram as a beam splitter. The intensity of light provided to the detector after reflection from a nearly 100% reflector using the Pencom design has been reported to be less than 10% of the light emitted by the laser. This extreme drop in intensity places severe demands on the amplifying circuitry used to control the focusing and tracking servos and requires an optical medium with high reflectivity. Moreover, the Pencom design allows a significant amount of reflected light to enter the optical cavity, which may result in instability of the laser. The Pencom holographic optical head will be described with reference to FIGS. 2A-B.

In the Pencom holographic optical head, laser 10 provides an incident light beam 30 which passes through collimator 14 and then into a holographic optical element 32. Holographic optical element 32 is not polarization-selective, and a portion of all incident light 30a, regardless of polarization, is diffracted. Approximately 10% of the incident beam 30a is diffracted into each of the plus and minus first order diffractions, and some, approximately 1-5%, of the incident beam 30a is diffracted into each of the plus and minus second and higher order diffractions. Smaller percentages of the incident beam 30a are diffracted into higher order diffractions. As a result, holographic beam splitter 32 has a forward efficiency of approximately 70%. Only the undiffracted incident beam 30b is focused on optical storage medium 22 by objective 24.

A reflected beam 30c is re-collimated by objective 24. When reflected beam 30c enters holographic beam splitter 32 the reflected beam 30c is again diffracted by holographic beam splitter 32. In the Pencom design, detector 26 is placed so that it receives diffracted reflected beam 30d, comprising the portion of the reflected beam 30c which is diffracted into the plus or minus first order after beam 30d again passes through collimator 14. Collimator 14 takes the place of concentrating lens 28 in the conventional design of FIG. 1.

The holographic optical element 32 of the Pencom optical head is shown in FIG. 2B. First and second substrates 34a, b are provided on each side of a holographic layer 36. Holographic layer 36 has a plurality of fringes 38 having a spacing d. In the holographic optical element 32 used in the Pencom optical head, the spacing d of fringes 38 is relatively large, on the order of 4 μm.

The downfall in the Pencom design is that only 10% of the reflected beam 30b is diffracted into the first order. Thus, the diffracted reflected beam 30d has an intensity of only 10% of reflected beam 30c. Assuming 100% efficiency of each of the elements and 100% reflection from the surface of the storage medium 22, the intensity of diffracted reflected beam 30c is only 7% of the intensity of the incident beam 30a, i.e., 10% of the 70% of the incident beam which is not diffracted by holographic optical element 32.

In addition, since the holographic optical element 32 utilized in the Pencom design is not polarization selective, the undiffracted reflected beam 30e passes back into the optical cavity of laser 10 which may cause instability of the laser. Moreover, with the holographic beam splitter 32 utilized by Pencom, it is not possible to remove the high order diffracted beams, i.e., diffracted beams above the first order.

NEC Corporation has constructed a holographic optical element to be used in a third conventional optical head, as described in "Compact Optical Head Using A Holographic Optical Element For CD Players," Kimira et al., Applied Optics, Vol. 27, No. 4, pp. 668–671. In the NEC design, multiple holograms containing tracking and focusing information used to track and focus the reflected beam on the detector array used for sensing the data are stored in the hologram of the holographic optical element. The surface relief holograms employed in the NEC design are not polarization selective.

Another holographic optical head is disclosed in U.S. Pat. No. 4,497,534 to Sincerbox. The Sincerbox holographic optical head, however, requires all of the optical elements in the head to be maintained in an environment having essentially the same index of refraction as the materials forming the optical elements to prevent total internal reflection of the diffracted beams within the holograms.

The polarization selectivity of holograms was discussed in the Appendix of "Coupled wave Theory For Thick Hologram Gratings," H. Kogelnik, Bell System Technical Journal, Vol. 48, No. 9, Nov. 1969, p. 2909. One phenomenon noted by Kogelnik is that holograms which diffract light perpendicularly, so that the diffracted light travels in a direction perpendicular to the direction of the incident light, exhibit the greatest polarization selectivity.

It is known that a hologram will diffract the "S" polarized portion of incident light by 90° while allowing the "P" portion of the polarized light to pass without diffraction. However, as known to those of ordinary skill in the art, the "S" polarized light cannot escape from the holographic material or the substrate on which the holographic material is supported since the light will be totally internally reflected, regardless of the angle that the incident beam makes with the surface of the hologram, after the light is diffracted by 90°. Thus, although it has been possible to create a hologram which selects one type of polarized light, it has been necessary to either use a prism to extract the diffracted light from the hologram or the supporting substrate or place the hologram in an environment having an index of refraction essentially the same as that of the hologram. One method of providing an environment having essentially the same index of refraction as the hologram, utilized by Sincerbox, is to have the substrate on which the hologram is supported (plural elements laminated with optical adhesive) extend between all of the elements in the optical head.

Optical heads used in, for example, compact disk players, operate in conjunction with a diode laser. However, there are no known holographic recording materials which can be utilized to record holograms having a large diffraction efficiency (i.e., near 100%) when the wavelength of the light used to record (or create) the hologram is in the infrared range—diode lasers emit light in the infrared range. Accordingly, it has been difficult to create holograms, and thus holographic optical elements, for use with diode lasers.

In order to create holograms which reconstruct infrared light with high efficiency, a multi-step process has been used to record the holograms. One such process is disclosed in "Efficient and Aberration-Free Wavefront Reconstruction From Holograms Illuminated At Wavelengths Differing From The Former Wavelength," L. H. Lin, et al., Applied Optics, Vol. 10, No. 6, June 1971, pg. 1314–1318. This multi-step method involves recording a first hologram at the infrared wavelength, illuminating the first hologram using blue light, and using the blue light diffracted by the first hologram to create a second high-efficiency hologram useful with infrared light.

SUMMARY OF THE INVENTION

It is therefore, an object of the present invention to provide a holographic optical element which is polarization-selective.

A further object of the present invention is to provide a polarization-selective holographic beam splitter which operates at two selected wavelengths.

Another object of the present invention is to provide a polarization-selective holographic beam splitter which diffracts only the second component of polarized light, namely S-polarized light, and which transmits the first component of polarized light, namely P-polarized light, undiffracted.

Another object of the present invention is to provide a holographic optical element which does not diffract a first type polarized light and which diffracts a second type polarized light into only one beam.

Another object of the present invention is to provide a polarization-selective holographic beam splitter having optical power, for use in an optical head, by storing holograms for cylindrical and other powers and for auto-focusing and tracking capabilities.

A holographic optical element in accordance with the present invention includes first and second transparent substrates, and first and second holographic layers provided between the transparent substrates. Each holographic layer contains a hologram which transmits a first polarized light component without diffraction and diffracts a second polarized light component by a selected angle.

An optical head in accordance with the present invention for interacting with an optical storage medium by directing an incident light beam at the optical storage medium and detecting a reflected light beam, includes source means for providing an incident light beam, the incident light beam being polarized in the P direction, a quarter-wave plate for converting the P-polarized incident light beam to a first type circularly polarized light beam and for converting a second type circularly polarized reflected light beam to a reflected light beam polarized in the S direction, and polarization-dependent holographic beam splitter means for transmitting, without diffraction, the P-polarized incident light beam, and for diffracting the S-polarized reflected light beam by a selected angle with respect to the P-polarized incident light beam.

DESCRIPTION OF THE PREFERRED EMBODIMENTS

A polarization selective holographic beam splitter and its use as a holographic optical element in an optical head will be described with reference to FIGS. 3–5. The recording of high diffraction efficiency holograms for use with a holographic beam splitter with light of a first wavelength so that the holograms can be reconstructed with light of a second wavelength will be described with reference to FIG. 6. As stated above, the optical head will be described as utilized in a compact disk player; however, an optical head in accordance with the present invention may be utilized to interact with any type of optical storage medium, for example, so-called laser disks for storing audio and video information optically, and magneto-optic disks for storing data for use in computer systems. In addition, the holographic beam splitter of the present invention has many uses and is not limited in its application to a holographic optical element in an optical head. Examples of other applications of a holographic beam splitter include laser scanners, such as bar code readers, and laser surveying equipment.

Figure 1:
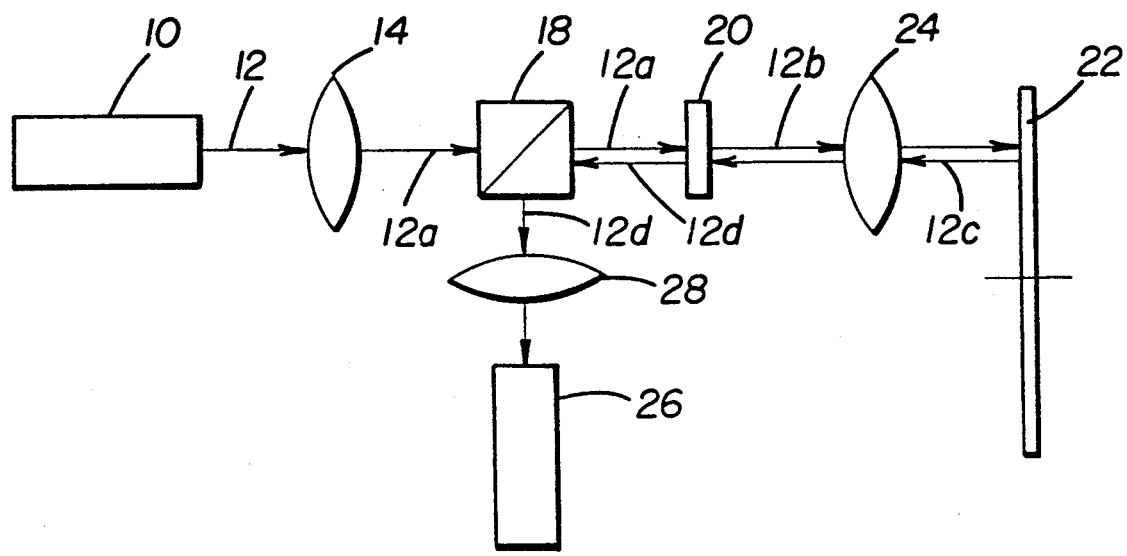
FIG. 1 is a block diagram of a first conventional optical head.
Figure 2A:
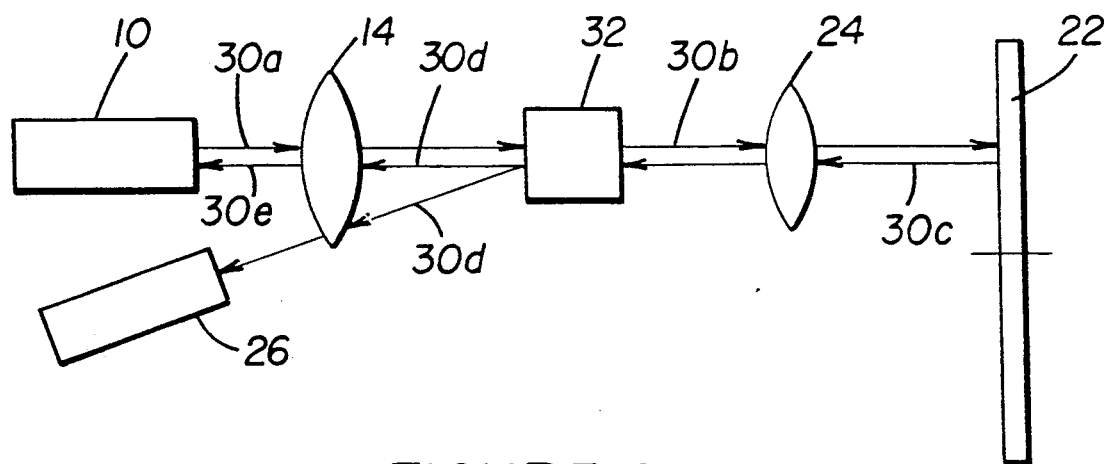
FIG. 2A is a block diagram of a second conventional optical head.
Figure 2B:
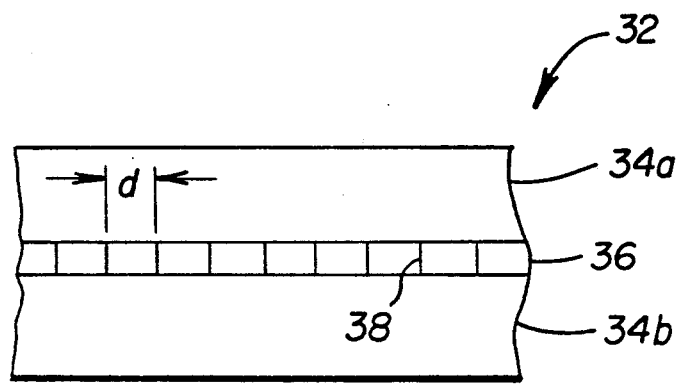
FIG. 2B is a cross-sectional view of a holographic optical element used in the second conventional optical head.
Figure 3:
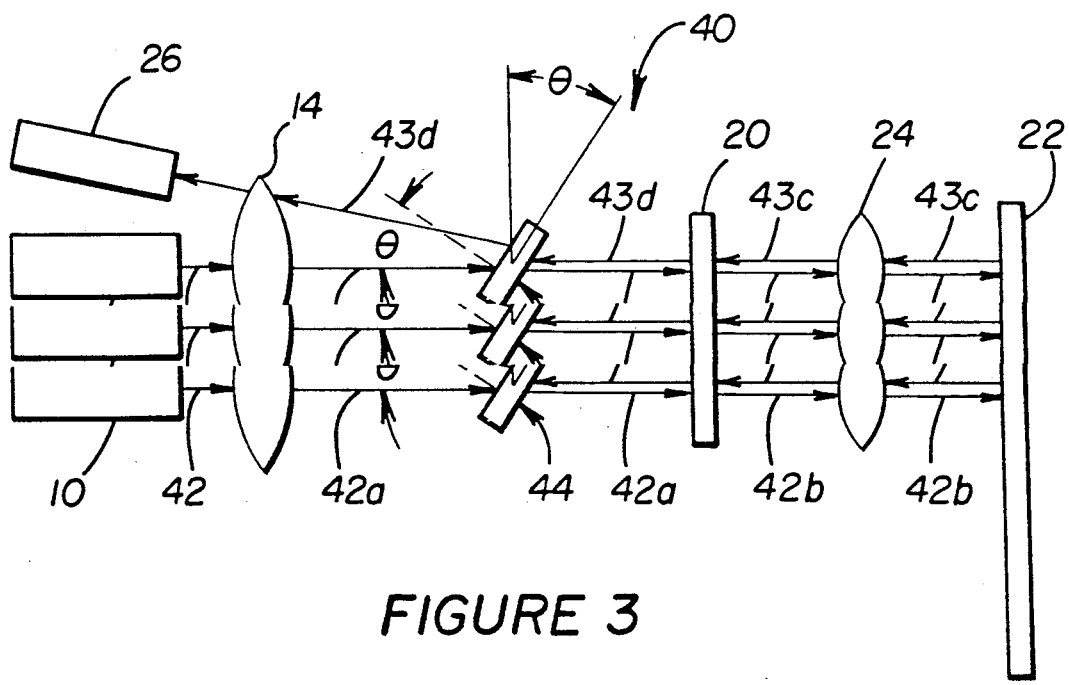
FIG. 3 is a block diagram of an optical head in accordance with the present invention.

An optical head 40 in accordance with the present invention in shown in FIG. 3. In operation, a laser 10 emits a beam of polarized incident light 42a which is collimated by collimator 14. The laser 10 is oriented so that the polarized incident beam 42a comprises P-type polarized light. The P-type polarized incident light 42a passes through holographic optical element 44 without being acted upon (the operation of holographic optical element 44 is discussed below). Quarter-wave plate 20 converts the P-type polarized incident light 42a to circularly polarized incident light 42b having a first type circular polarization. The circularly polarized incident light 42b is focused on disk 22 by objective 24.

A circularly polarized reflected beam 43c has a second type circular polarization, i.e., if incident beam 42b is right-hand circularly polarized, reflected beam 43c is left-hand circularly polarized, and vice versa. The reflected beam 43c is re-collimated by objective 24 and then converted to an S-type polarized reflected beam 43d by quarter-wave plate 20. The polarization selectivity of holographic optical element 44 causes the S-polarized reflected beam 43d to be diffracted, whereas the P-polarized incident beam 42a was not diffracted, with the result that the S-polarized reflected beam 43d emerging from holographic optical element 44 makes an angle with the incident beam 42. Reflected beam 43d passes through collimator 14 and then to detector 26. The angular displacement of the S-polarized reflected beam 43d with respect to incident beam 42 allows detector 26 to be provided alongside laser 10. In the environment of a compact disk player, laser 10 may be a diode laser, and the diode laser and detector 26 may be provided on a single substrate.

Figure 4A:
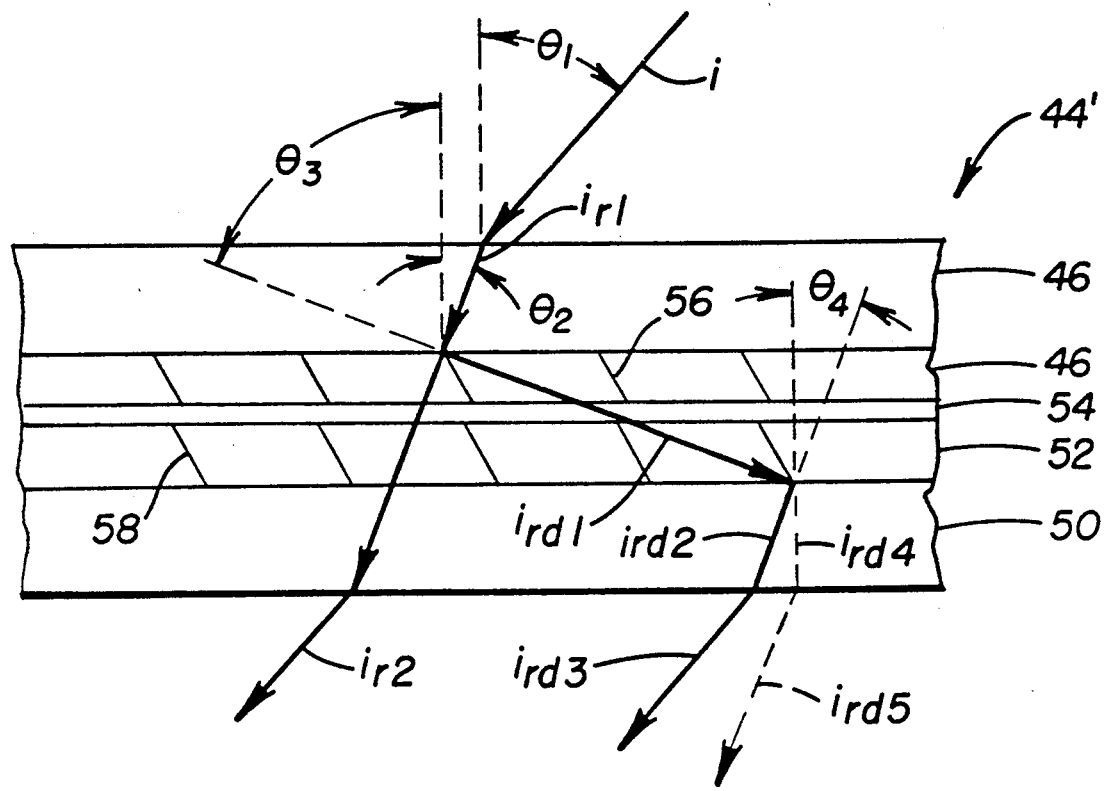
FIGS. 4A and 4B are cross-sectional views of polarization-selective holographic beam splitters in accordance with the present invention for illustrating the beam splitting capability thereof.

A first polarization selective holographic beam splitter (or holographic optical element) 44 in accordance with the present invention is shown in FIG. 4A, and the operation of the holographic beam splitter 44 as holographic optical element 44 in optical head 40 will be described with reference to FIG. 5. Holographic optical element 44 comprises a first substrate 46 having a first holographic layer 48 provided on one surface thereof. A second substrate 50 has a second holographic layer 52 on one of its surfaces, and an adhesive layer 54 bonds first and second holographic layers 48 and 52.

First and second substrates 46, 50 may be standard glass plates and holographic layers 48, 52 may be formed of, for example, dichromated gelatin which could be provided on respective substrates 46, 50 by doctor blading or spin coating. Substrates 46, 50 may comprise other transparent materials, for example, plastic, and alternative materials for holographic layers 48, 52 include silver halide and photopolymeric materials. The adhesive 54 may be, for example, Norland 60 transparent adhesive.

Prior to joining holographic layers 48, 52 with adhesive 54, holograms in the form of a diffraction grating are recorded in each of the holographic layers 48, 52. These diffraction gratings comprise a series of fringes 56, 58 having a different index of refraction than the other portions of the holographic layers 48, 52.

When an incident light beam i having P-polarized and S-polarized components passes through holographic optical element 44, the P and S-polarized components of the incident beam are separated in the following manner. The incident beam i is refracted upon entering first substrate 46. The refracted incident beam $i_{r1}$ then passes into first holographic layer 48. The P-polarized component of refracted incident beam $i_{r1}$ is unaffected by either first or second holographic layers 48, 52, and thus travels through first holographic layer 48, adhesive 54, and second holographic layer 52 without diffraction. Upon reaching the substrate/air interface when exiting second substrate 50, the P-polarized light $i_{r1}$ is refracted into an exiting beam $i_{r2}$ parallel with incident beam i.

On the other hand, the S-polarized component of beam $i_{r1}$ is diffracted by an angle determined by the orientation and spacing of fringes 56 upon passing through first holographic layer 48, yielding beam $i_{rd1}$. The angle of diffraction for the hologram in first holographic layer 48 may be selected to be 90° to take advantage of the high polarization selectivity provided by a 90° diffraction. The beam $i_{rd1}$ would be totally internally reflected at the interface of any two media having different indices of refraction, for example, at a first holographic layer 48/air interface, or at a substrate/air interface if a substrate is provided on the opposite side of first holographic layer 48 from the first substrate 46. In order to prevent the total internal reflection of beam $i_{rd1}$, second holographic layer 52 diffracts beam $i_{rd1}$ a second time to yield diffracted beam $i_{rd2}$. Beam $i_{rd2}$ travels at an angle such that beam $i_{rd2}$ will be refracted, not totally internally reflected, at the air/second substrate 50 interface. The S-polarized exiting beam $i_{rd3}$ will be spatially separated from the exiting P-polarized beam $i_{r2}$.

If the second holographic layer 52 diffracts beam $i_{rd1}$ by 90°, exiting beams $i_{r2}$ and $i_{rd3}$ will be parallel. Alternatively, the angle of fringes 58 in second holographic layer 52 may be selected so that beam $i_{rd1}$ is diffracted by more or less than 90°. The dashed-line example in FIG. 4A shows the result if beam $i_{rd4}$ is diffracted by less than 90° with respect to beam $i_{rd1}$, in which case beams $i_{r2}$ and $i_{rd5}$ will be spatially separated and will be traveling in different directions. The spatial separation achieved with optical element 44 may not be large, and thus the angular difference in the direction of exiting beams $i_{r2}$ and $i_{rd5}$ may be the more useful method of separating the P and S polarized components of incident beam i.

The drawings treat the light beams as lines and show the diffraction of the beams occurring at one fringe in each holographic layer 48, 52. In practice, the light has a diameter and the light behaves as a wave, as opposed to a particle, and thus the diffraction of a beam occurs throughout the thickness of a holographic layer.

As discussed with respect to FIG. 3 in optical head 40 P-polarized light travels through holographic optical element 44 in one direction and S-polarized light travels through holographic optical element 44 in the other direction. The operation of holographic optical element 44 in this situation will be described with reference to FIG. 5. The angles $\alpha_1$ and $\alpha_2$ of respective fringes 56, 58 in holographic layers 48, 52 depend on the angle of diffraction which is desired and upon the angle at which the incident light enters the holographic layer. (The calculation of the fringe angle is discussed below.) In one embodiment of the present invention the polarized incident beam 42a is incident on holographic optical element 44 at Brewster's angle, shown as $\theta_1$. This angle of incidence is accomplished by rotating holographic optical element 44 by the same angle $\theta_1$ (FIG. 3).

The P-polarized incident light 42a is refracted at the air/first substrate 46 interface, and then travels through first substrate 46, first holographic layer 48, adhesive layer 54, second holographic layer 52, and second substrate 50 before being refracted again at the second substrate 50/air interface. S-polarized reflected beam 42d, which is traveling in the opposite direction than P-polarized incident beam 42a and also enters holographic optical element at Brewster's angle, is refracted at the air/second substrate 50 interface to beam $42d_r$. Beam $42d_r$ makes an incident angle $\theta_2$ with second holographic layer 52 and is diffracted by 90° by second holographic layer 52, resulting in beam $42d_{rd1}$. Beam $42d_{rd1}$ makes a diffracted angle $\theta_3$, travels through adhesive 54, and is incident on first holographic layer 48 at angle $\theta_3$—in the case where first and second holographic layers 48, 52 are parallel the diffracted angle for one holographic layer is the incident angle for the other holographic layer. Beam $42d_{rd1}$ is then diffracted by first holographic layer 48, resulting in beam $42d_{rd2}$. The angle of fringes 56 in first holographic layer 48 is selected so that the angle $\gamma$ by which beam $42d_{rd1}$ is diffracted is less than 90°, so that beam $42d_{rd2}$ when refracted at the first substrate 46/air interface exits the holographic optical element 44 as beam $42d_{rd3}$ which is not parallel with beam 42a. Thus, $\theta_2 \neq \theta_4$. (It is noted that the incident and diffracted angles $\theta_1$–$\theta_4$ are all measured as positive angles with a normal to the holographic layer.)

The spacing $d_1$ of fringes 56 in first holographic layer 48 and the spacing $d_2$ of fringes 58 in second holographic layer 52 is established in accordance with the following equation:

$$d = \lambda/2n \sin \psi \qquad (1)$$

where $\lambda$ is the wavelength of the light emitted by laser 10, n is the index of refraction of the holographic layer (not fringes 56, 58), and $\psi$ represents the angle of incidence and reflection (which are equal) between the beam and the normal to fringes 56, 58.

The thicknesses $t_1$ and $t_2$ of first and second holographic layers 48, 52 and the change in the index of refraction between the holographic layers 48, 52 and the fringes 56, 58 are selected using known parameters to provide substantially 100% diffraction efficiency for S-polarized light, as disclosed by Kogelnik.

Figure 4B:
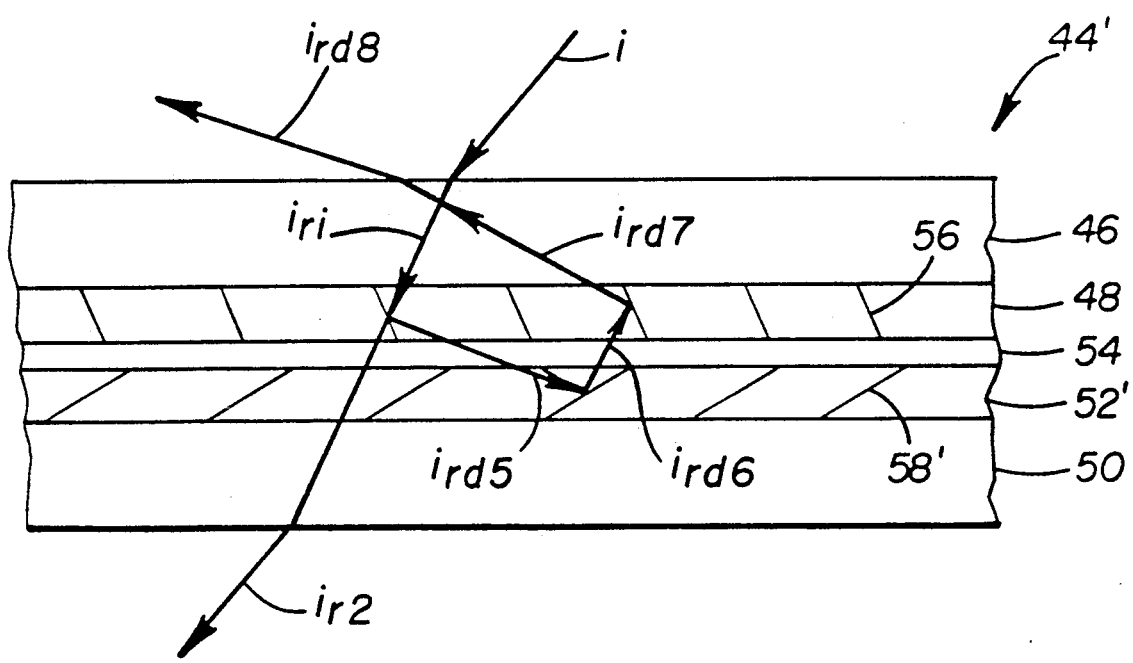

An alternative beam splitter 44' in accordance with the present invention will be described with reference to FIG. 4B. In operation of beam splitter 44' an incident beam i is refracted at the air/first substrate 46 interface, and the P-polarized component of refracted beam $1_{r1}$ passes through first holographic layer 48, adhesive layer 54, second holographic layer 52', and second substrate 50 without diffraction, and is refracted at the second substrate 50/air interface to yield exiting beam $i_{r2}$. The S-polarized component of beam $i_{r1}$ is diffracted by fringes 56 in first holographic layer 48. The diffracted beam $i_{rd1}$ passes through adhesive layer 54 and then is diffracted by fringes 58' in second holographic layer 52' back through adhesive layer 54 and into first holographic layer 48 as beam $i_{rd6}$. Beam $i_{rd6}$ is again refracted by first holographic layer 48 to provide beam $i_{rd7}$ which is again refracted at the first substrate 46/air interface to yield exiting beam $i_{rd8}$. Exiting beam $i_{rd8}$ travels in a different direction than incident beam i, and thus the S-polarized component of incident beam i can be separated into the P-polarized component of beam $i_{r2}$ and the S-polarized component of beam $i_{rd8}$.

In order to prevent the S-polarized portion of the beam from being totally internally reflected, the fringe angle $\alpha_2$ of fringes 58' in second holographic layer 52 is selected to be large enough so that beam $i_{rd7}$ is not totally internally reflected at the first substrate 46/air interface.

To achieve maximum efficiency when reconstructing the holographic image, the Bragg condition must be satisfied. The Bragg condition for waves diffracted from fringes spaced a distance d apart is expressed by equation (1). If the diffracted beam is perpendicular to the incident beam, then $\psi = 45°$. Using an index of refraction $n = 1.51$ for substrates 46, 50, holographic layers 48, 52, and adhesive 54 (assuming similar indices of refraction) and $\lambda = 0.8$ $\mu m$ (the wavelength of a diode laser), the fringe spacing d is 0.374 $\mu m$. For a beam entering the substrate at Brewster's angle, the entrance angle $\theta_1$ is:

$$\arctan n = 56.5°. \tag{2}$$

Using Snell's Law the angle $\theta_2$ of the beam after refraction at the air/first substrate 46 interface is $33.8°_2$ the direction in which the beam is traveling with respect to the normal to the holographic layer when incident upon fringes 56. The tilt angle $\alpha_1$ is $\frac{1}{2}(\theta_3-\theta_2)$, where $\theta_3$ is the angle between the diffracted beam and the normal to the holographic layer. For a 90° diffraction $\alpha_1 = 11.5°$.

Figure 5:
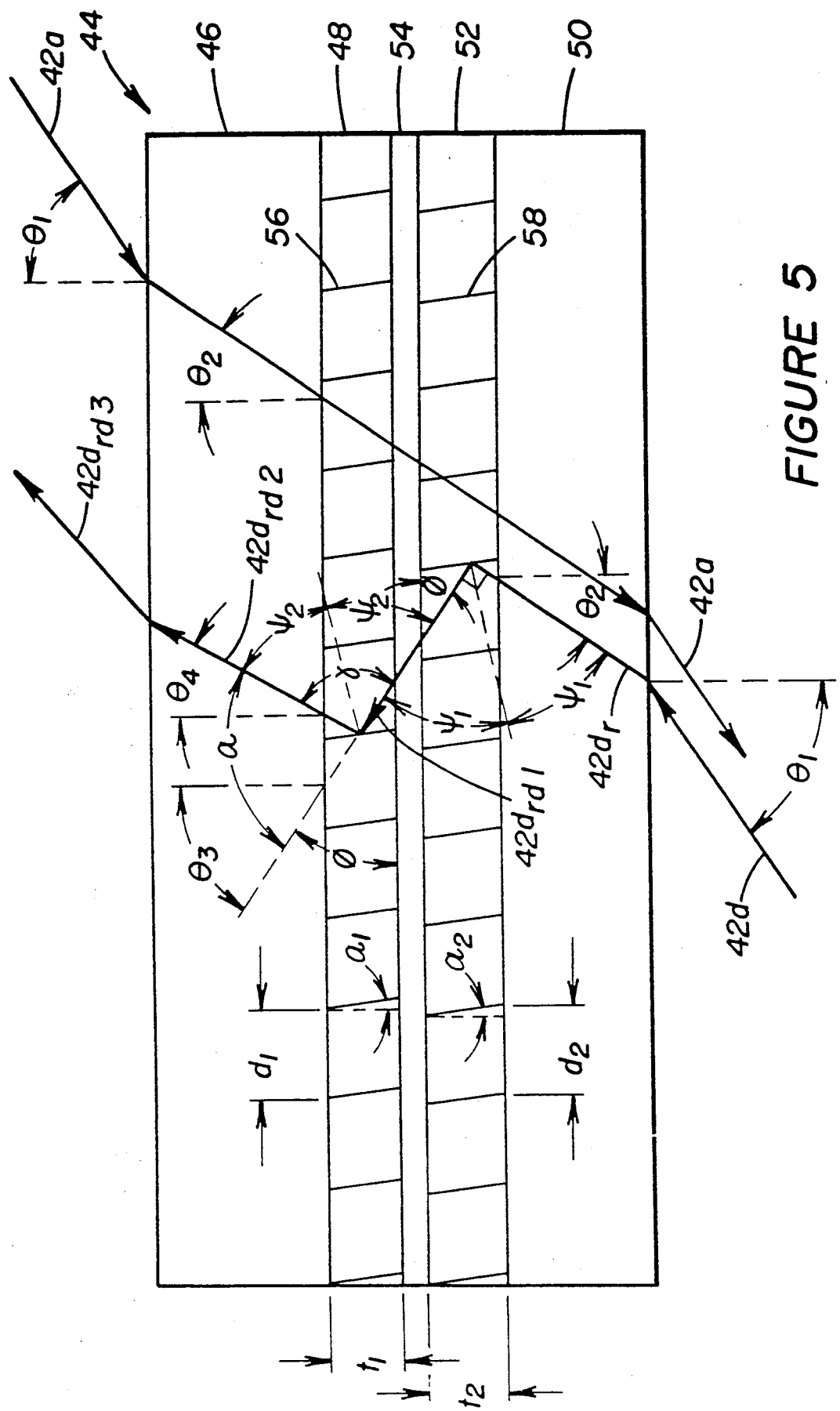
FIG. 5 is a cross-sectional view of a holographic polarization-selective beam splitter in accordance with the present invention for describing its use in an optical head.

In the holographic optical element shown in FIG. 5 the tilt angle $\alpha_1$ of the fringes 56 is slightly greater than the tilt angle $\alpha_2$ of fringes 58 so that the angle of diffraction $\gamma$ provided by first holographic layer 48 is slightly less than 90°. If $\alpha_1 = \alpha_2$, the fringes 56, 58 in respective holographic layer 48, 52 are aligned so that the parallel planes of the fringes 56 in holographic layer 48 are substantially parallel to the parallel planes of the fringes 58 in holographic layer 52. If different angles of diffraction for the two holographic layers 56, 58 are desired, a small difference in $\alpha_1$ and $\alpha_2$ creates an angle between the parallel planes of the fringes 56, 58 in the respective first and second holographic layers 48, 52. The range of angles between the parallel planes of the fringes 56, 58 depends on the indices of refraction of the various elements, the thickness of the holographic layers 46, 50, and the wavelength of the light, and is generally less than 45°.

For purposes of focusing the light on the disk 22, it is convenient to add optical power to the holograms in the holographic optical element 44. The optical power is usually astigmatic; however, optical poWer is to be considered as the production of any deviation from collimation. Astigmatic optical power produces different spherical diverging or converging in two perpendicular directions.

In order to record a hologram utilizing light having a first wavelength so that the hologram can be reconstructed at a second wavelength with a high diffraction efficiency, the inventors have developed an apparatus and a method which will be described with reference to FIG. 6. In particular, since diode lasers are contemplated as the light source for reconstructing the holograms in the environment of a compact disk player, and thus the wavelength for reconstruction would be $\lambda = 0.8$ $\mu$m—a wavelength which cannot be used to record high diffraction efficiency holograms.

Figure 6:
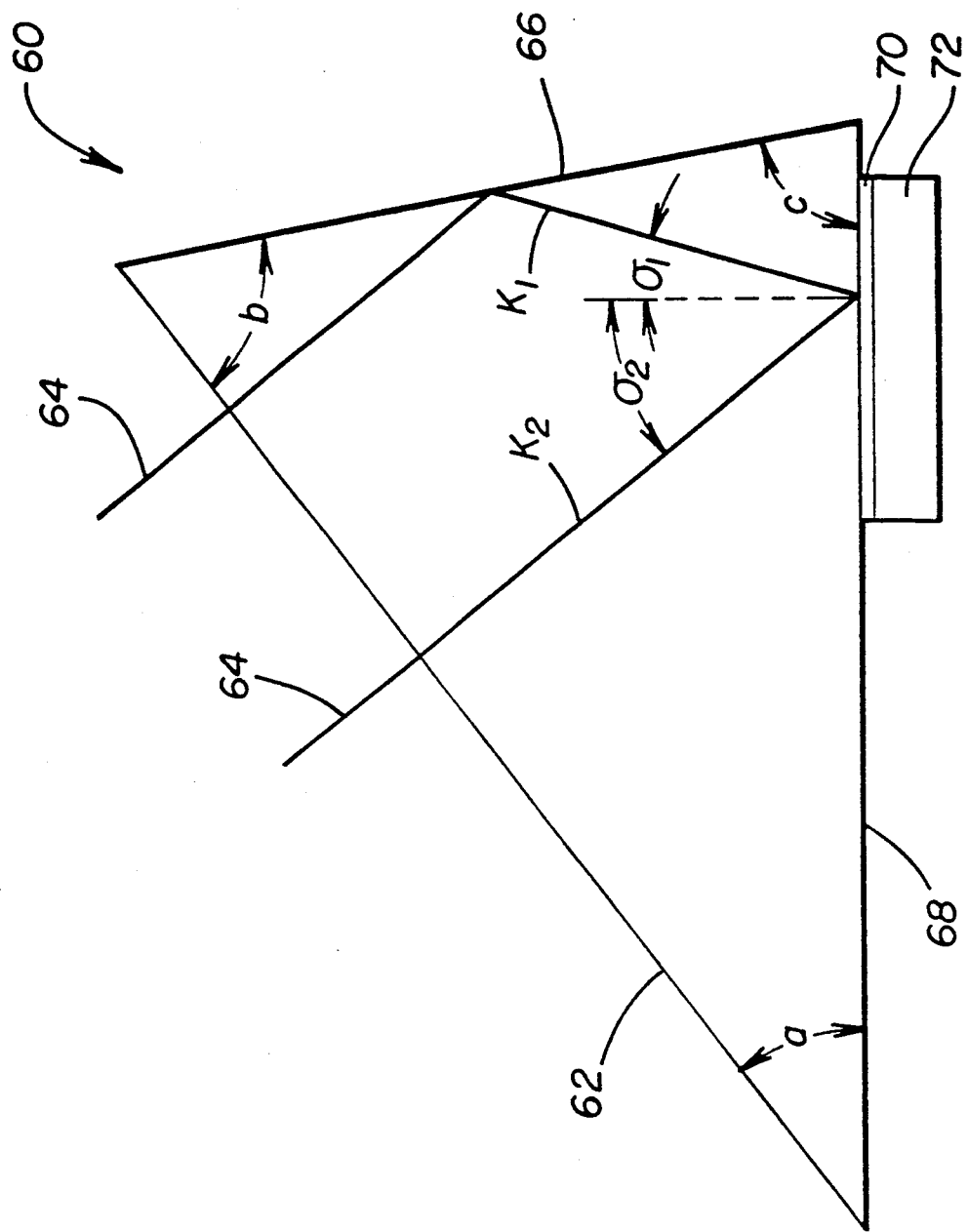
FIG. 6 is a cross-sectional view of a prism used for recording the holograms used in a holographic polarization-selective beam splitter in accordance with the present invention.
Figure 3:
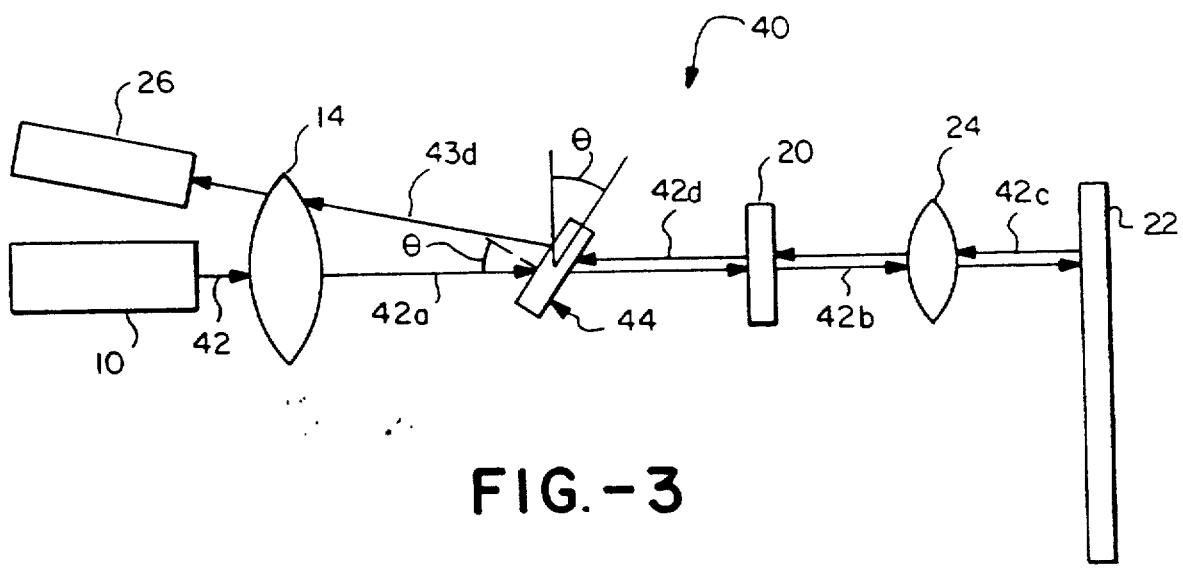

FIG. 6 illustrates the recording of holograms in a holographic layer 70 provided on a substrate 72 utilizing a prism 60 having angles a, b, and c. The hypotenuse 62 of prism 60 was oriented to face incident light 64. The portion of incident light 64 which is totally internally reflected by the smallest side 66 of prism 60 interferes with the incident light 64 which does not strike side 66. The resulting interference pattern is used to create the hologram in holographic layer 70. The recording process requires index matching holographic layer 70 against side 68 of prism 60 near the intersection of side 68 and the smallest side 66.

$\vec{K}_1$ and $\vec{K}_2$ are the wave vectors of the construction beams, where $K_1$ is the portion of the beam totally internally reflected by side 66 of prism 60 and $K_2$ is the beam transmitted directly through prism 60. The vector sum of wave vectors $\vec{K}_1$ and $\vec{K}_2$ is equal to $\vec{K}_0$:

$$\vec{K}_0 = \vec{K}_1 + \vec{K}_2; \text{ and} \tag{3}$$

$$|\vec{K}_1| = |\vec{K}_2| \tag{4}$$

Beam $\vec{K}_0$ (not shown) is required to make an angle $\alpha$ (the tilt angle of the fringes) with respect to a normal to the surface of holographic layer 70. The tilt angle $\alpha$ is:

$$\alpha = \frac{1}{2}(\sigma_2 - \sigma_1) \tag{5}$$

where $\sigma_1$ is the angle which wave $\vec{K}_1$ makes with the normal to the surface of holographic layer 70 and $\sigma_2$ is the angle which wave $\vec{K}_2$ makes with the normal to the surface of holographic layer 48. For incident angle $\theta_2$ and diffracted angle $\theta_3$ at reconstruction, and angles $\sigma_1$ and $\sigma_2$ at recording:

$$|\sigma_2 - \sigma_1| = |\theta_3 - \theta_2|. \tag{6}$$

The vector representation of $\vec{K}_0$ is as follows:

$$\vec{K}_0 = [2\pi/\lambda_1][(-\sin \sigma_1 + \sin \sigma_2)\vec{X} + (\cos \sigma_1 + \cos \sigma_2)\vec{Y}], \tag{7}$$

where $\vec{X}$ is a unit vector perpendicular to the normal to the surface of holographic layer 70 pointing to the left in FIG. 6, $\vec{Y}$ is a unit vector parallel to the normal to the surface of holographic layer 70 pointing down in FIG. 6, $\lambda_1$ is the wavelength of the light used to record the hologram, and the Bragg condition (equation (1)) is satisfied for $\lambda_1$ and the wavelength $\lambda_2$ of the light used to reconstruct the hologram. The Bragg condition requires that $$d = \lambda_1/(2n \sin \psi) \tag{8}$$

and that $$d = \lambda_2([2n(\sin \theta_2 + \sin \theta_3)]. \tag{9}$$

Equations (5), (7) and (8) can be solved for $\theta_2$ and $\theta_3$, which can be used in equation (6) to calculate the angles for prisms useful in recording holograms (or fringes) with light of wavelength $\lambda_1$ which can be reconstructed at $\lambda_2$. For example, if $\lambda_1$ 0.5145 $\mu$m (514.5 nm) and $\lambda_2 = 0.8$ $\mu$m (800 nm), angles of prism 60 are as follows: angle a is 39.0 degrees; angle b is 62.55 degrees; and angle c is 78.45 degrees.

The derivation of equations (5)–(9) assumes that there is no change in the thickness of the holographic layer during development of the holograms. It is possible to use development recipes which produce little or no change in the thickness of the holographic layer; however, such recipes require close monitoring.

To account for changes in the thickness of the holographic layer during development, it is necessary to consider a change in the tilt angle $\alpha$ caused by swelling or shrinkage of the holographic layer during development. The final tilt angle $\alpha'$ after development is related to the tilt angle during exposure $\alpha$ by a shrinkage factor s, where:

$$s = \alpha'/\alpha. \tag{10}$$

When the shrinkage factor is taken in account, equation (6) is modified as follows:

$$|\sigma_2 - \sigma_1| = |(\theta_3 - \theta_2)/s| \tag{6'}$$

combining equations (5) and (6') yields the following relationship:

$$2\alpha = |\sigma_2 - \sigma_1| = |(\theta_3 - \theta_2)/s|. \tag{11}$$

The following experiments were conducted by the inventors. Dichromated gelatin layers were coated on each of two glass plates. Holograms (fringes) were recorded using an argon laser having a wavelength of 0.5145 μm (514.5 nm) and a prism 60 having the angles a=39°, b=62.55° and c=78.45°. The holographic layers were developed using standard process for this type of holographic layer. Norland 60 transparent adhesive was used to bond the two holographic layers together to achieve the orientation shown in FIGS. 4A and 5.

This orientation was achieved by laying two holograms next to each other so that the fringes in each hologram have the same orientation (except that the tilt angles may be different) with respect to an x, y, z coordinate system. One hologram is then "flipped" onto the other so that the parallel planes of the fringes in the first hologram and the second hologram are substantially parallel or make a small angle (less than 45°) with respect to each other. This orientation process is called flipping.

The holographic optical element created with these holograms displayed a new image not present in the individual holograms, a monochromatic, angle sensitive image of a source when viewed through the holographic optical element.

The holographic optical element was mounted in front of a collimated laser light source provided by a He-Ne laser having a wavelength of 633 nm (0.633 μm). The holographic optical element was placed in a mount so the light was projected into the element at Brewster's angle. Vertically polarized light, namely S-polarized light, emitted from the laser was diffracted into only one beam by the holographic optical element. The zero and first order diffracted beam spots were the only spots present, showing that no higher order diffractions occurred. A half-wave plate was then inserted between the laser and the holographic optical element so that the polarization was horizontal, namely P-polarized light. When the P-polarized light was incident on holographic optical element the only beam spot observed corresponded to undiffracted P-polarized light.

The intensity of the zero and first order diffracted beams of P and S-polarized light using a HeNe laser as the light source was measured. For the P-polarized light an intensity of less than 1 μwatt was measured for the diffracted beam and an intensity of 1500 μwatts was measured for the undiffracted beam. For the S-polarized light an intensity of 250 μwatts was measured for the diffracted beam and an intensity of 1200 μwatt was measured for the undiffracted beam. These intensity values demonstrate the polarization selectivity, the diffraction into a single beam for S-polarized light, and the transmission without diffraction of the P-polarized light. The experiments were conducted using holograms which did not have a 100% diffraction efficiency; however, with 100% diffraction efficiency it is contemplated that the entire S-polarized beam would be diffracted.

The many features and advantages of the polarization selective optical element of the present invention will be apparent to those of ordinary skill in the art from the specification. Accordingly, the following claims are intended to cover all modifications and equivalents falling within the scope of the invention.

What is claimed is:

1. A holographic optical element, comprising:
    first holographic means for transmitting without diffraction a first component of incident light and diffracting a second component of the incident light by a selected angle in a selected plane;
    second holographic means for transmitting without diffraction the first component of the incident light transmitted by said first holographic optical element and diffracting the second component of the incident light diffracted by said first holographic optical element by a selected angle in said selected plane; and
    means for maintaining said first and second holographic means in optical contact so that the second component of incident light diffracted by said first holographic means is transmitted into said second holographic means substantially without refraction.

2. A holographic optical element according to claim 1, wherein the first and second components of the incident light are P and S-polarized light, respectively.

3. A holographic optical element according to claim 2, wherein said second holographic means diffracts the S-polarized light diffracted by said first holographic means so that the S and P components of the incident light make an angle of greater than zero degrees with respect to each other upon exiting said second holographic means.

4. A holographic optical element according to claim 2, wherein:
    said second holographic means diffracts the S-polarized component of the incident light diffracted by said first holographic means back into said first holographic means; and
    said first holographic means diffracts the S-polarized component of the incident light diffracted by said second holographic means so that the S-polarized component of the incident light exits the holographic optical element from said first holographic means.

5. A holographic optical element, comprising:
    first and second transparent substrates;
    first and second holographic layers provided between said transparent substrates, each of said first and second holographic layers having first and second surfaces and containing a hologram which transmits a first polarized light component without diffraction and which diffracts a second polarized light component by a selected angle, said first holographic layer diffracting the second polarized light component so that the diffracted second polarized light component makes an angle of greater than arcsin 1/n with a normal to one of said surfaces of said first holographic layer, where n is the index of refraction of said first holographic layer, said first and second holographic layers diffracting the second polarized light component in the same plane; and
    means for joining said first and second holographic layers so that the second polarized light component is transmitted from said first holographic layer to said second holographic layer.

6. A holographic optical element according to claim 5, wherein said second holographic layer diffracts the second polarized light component diffracted by said first holographic layer into said second substrate.

7. A holographic optical element according to claim 6, wherein said first holographic layer diffracts the second polarized light component substantially perpendicularly and said second holographic layer diffracts the second polarized light component by less than 90 degrees.

8. A holographic optical element according to claim 5, wherein said holograms provided in said first and second holographic layers comprise a plurality of fringes.

9. A holographic optical element according to claim 8, wherein said plurality of fringes have a spacing and a tilt angle.

10. A holographic optical element according to claim 9, wherein:
   said fringes in said first holographic layer lie in a first group of parallel planes;
   said fringes in said second holographic layer lie in a second group of parallel planes; and
   said first group of parallel planes intersect said second group of parallel planes at an angle less than forty-five degrees.

11. A holographic optical element according to claim 9, wherein:
   said fringes in said first holographic layer lie in a first group of parallel planes;
   said fringes in said second holographic layer lie in a second group of parallel planes; and
   said first and second groups of parallel planes are substantially parallel.

12. A holographic optical element according to claim 5, wherein said holographic layer comprises dichromatic gel, silver halide, or photopolymeric material.

13. A holographic optical element according to claim 5, wherein the said second holographic layer adds optical power to the diffracted light.

14. A holographic optical element according to claim 13, wherein said second holographic layer has astigmatic optical power.

15. A holographic optical element according to claim 5, wherein said first and second holographic layers diffract the second polarized light component into a single beam.

16. A holographic optical element according to claim 15, wherein the first light component is the P component of polarized light and the second light component is the S component of polarized light.

17. A holographic beam splitter for separating the S and P portions of polarized incident light, comprising:
   a first transparent substrate;
   first holographic means provided on said first transparent substrate for diffracting the S-polarized incident light by substantially 90 degrees in a selected plane and for transmitting the P-polarized incident light undiffracted;
   second holographic means provided on said first holographic means for diffracting the S-polarized incident light diffracted by said first holographic means by a selected angle in the same plane as the first holographic means and for transmitting the P-polarized incident light undiffracted; and
   a second transparent substrate provided on said second holographic means.

18. A holographic beam splitter according to claim 17, wherein:
   said first holographic means diffracts the S-polarized incident light into said second holographic means; and
   said second holographic means diffracts the S-polarized light into said second substrate.

19. A holographic beam splitter according to claim 18, wherein said holograms provided in said first and second holographic layers comprise a plurality of fringes.

20. A holographic beam splitter according to claim 19, wherein said plurality of fringes have a spacing and a tilt angle.

21. A holographic beam splitter according to claim 17, wherein:
   said second holographic means diffracts the S-polarized incident light into said second holographic means;
   said second holographic means diffracts the S-polarized light diffracted by said first holographic means into said first holographic means; and
   said first holographic means diffracts the S-polarized incident light diffracted by said second holographic means into said first substrate.

22. A holographic optical element, comprising:
   first and second transparent substrates; and
   first and second holographic layers provided between and adjacent to corresponding ones of said first and second transparent substrates, said first holographic layer containing a hologram which transmits a first polarized light component without diffraction and diffracts a second polarized light component substantially perpendicularly and diffracts the second polarized light component into said second holographic layer, said second holographic layer containing a hologram which transmit the first polarized light component without diffraction and diffracts the second polarized light component by an angle greater than or equal to ninety (90) degrees and diffracts the second polarized light component into said second substrate.

23. A holographic optical element according to claim 22, wherein said first and second holographic layers diffract the second polarized light component in the same plane.

24. A holographic optical element, comprising:
   first and second transparent substrates; and
   first and second holographic layers provided between and adjacent to corresponding ones of said first and second transparent substrates, said first holographic layer containing a hologram which transmits a first polarized light component without diffraction and diffracts a second polarized light component substantially perpendicularly and diffracts the second polarized light component into said second holographic layer, said second holographic layer containing a hologram which transmit the first polarized light component without diffraction and diffracts the second polarized light component substantially perpendicularly and diffracts the second polarized light component into said second substrate.

25. A holographic optical element according to claim 24, wherein said first and second holographic layers diffract the second polarized light component in the same plane.

26. A holographic optical element for separating the P-polarized and S-polarized components of a beam of light, comprising:
   first and second substrates, each substrate having first and second parallel surfaces, said beam of light being incident on said first surface of said first substrate;
   a first holographic element provided on said second surface of said first substrate, said beam of light being transmitted through said first substrate and into said first holographic element, said first holographic element transmitting the P-polarized component of said beam of light without diffraction and diffracting the S-polarized component of said beam of light by approximately ninety degrees in a selected plane;

a second holographic element provided on said first surface of said second substrate, said second holographic element facing said first holographic element so that said second holographic element receives the P-polarized component of said beam of light from said first holographic element and transits the P-polarized component of said beam of light without diffraction, and so that said second holographic element receives the S-polarized component of said beam of light from said first holographic element and diffracts the S-polarized component of said beam of light, said second holographic element diffracting said S-polarized component of said beam of light in the same plane that said first holographic element diffracts the S-polarized component of said beam of light; and means for transmitting the P-polarized and S-polarized components of said beam of light from said first holographic element to said second holographic element substantially without refraction and for joining said first and second holographic elements.

27. A holographic optical element, comprising:

first holographic means, having first and second surfaces, for transmitting without diffraction a first component of light incident on said first surface and diffracting a second component of the light incident on said first surface so that said diffracted second component makes an angle greater than forty-five degrees with a normal to said second surface;

second holographic means, having first and second surfaces, for transmitting without diffraction a first component of light incident on said first surface of said second holographic means and diffracting a second component of light incident on said first surface of said second holographic means; and means for maintaining said second surface of said first holographic means and said first surface of said second holographic means in optical contact so that the second component of the light diffracted by said first holographic means is transmitted into said second holographic means.

28. A holographic optical element, comprising:

first holographic means for transmitting without diffraction a first component of incident light and diffracting a second component of the incident light by approximately ninety degrees in a selected plane;

second holographic means for transmitting without diffraction the first component of the incident light transmitted by said first holographic optical element and diffracting the second component of the incident light diffracted by said first holographic optical element by a selected angle in the selected plane; and a medium, having an index of refraction substantially the same as the indices of refraction of said first and second holographic means, provided between and in contact with said first and second holographic means so that the first and second components of light are transmitted from said first holographic means to said second holographic means without being totally internally reflected in said first holographic means.

* * * * *

UNITED STATES PATENT AND TRADEMARK OFFICE
CERTIFICATE OF CORRECTION

PATENT NO. : 5,013,107

DATED : May 7, 1991

INVENTOR(S) : Jonathan R. Biles

It is certified that error appears in the above-identified patent and that said Letters Patent is hereby corrected as shown below:

Fig. 3 should be deleted to appear as per attached fig. 3

Signed and Sealed this

First Day of September, 1992

Attest:

DOUGLAS B. COMER

Attesting Officer

Acting Commissioner of Patents and Trademarks